(12) United States Patent
Vohra et al.

(10) Patent No.: US 10,306,050 B2
(45) Date of Patent: May 28, 2019

(54) CONTROLLING THE ACTIONS OF A MOBILE BROWSER

(71) Applicant: Microsoft Technology Licensing, LLC, Redmond, WA (US)

(72) Inventors: Rahul Vohra, San Francisco, CA (US); Martin Alexander Kleppmann, Kingston upon Thames (GB); Lee Mallabone, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/194,073

(22) Filed: Feb. 28, 2014

(65) Prior Publication Data
US 2015/0046843 A1 Feb. 12, 2015

Related U.S. Application Data

(60) Provisional application No. 61/863,165, filed on Aug. 7, 2013.

(51) Int. Cl.
*G06F 3/048* (2013.01)
*H04M 1/725* (2006.01)
*G06F 9/445* (2018.01)
*G06F 17/30* (2006.01)

(52) U.S. Cl.
CPC ........ *H04M 1/72561* (2013.01); *G06F 3/048* (2013.01); *G06F 9/44536* (2013.01); *G06F 17/30899* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 8,738,764 B1 * | 5/2014 | Schepis ............... | G06F 21/6218 709/224 |
| 8,943,520 B1 * | 1/2015 | Roka ........................ | G06F 3/00 719/320 |
| 2004/0111488 A1 * | 6/2004 | Allan ................ | G06F 17/30899 709/217 |
| 2004/0225708 A1 * | 11/2004 | Christodoulou .... | G06F 17/3089 709/200 |
| 2008/0091843 A1 * | 4/2008 | Kulkarni ........... | G06F 17/30887 709/239 |

(Continued)

*Primary Examiner* — Xuyang Xia
(74) *Attorney, Agent, or Firm* — Schwegman Lundberg & Woessner, P.A.

(57) ABSTRACT

Methods and systems of controlling the actions of a mobile browser to accommodate situations where a mobile application corresponding to a selected link is installed, as well as not installed, on a mobile device are described. In some embodiments, a selectable link associated with a mobile application is displayed within a mobile resource on a mobile device. A user selection of the selectable link is received. Content associated with the selectable link is displayed on the mobile device in response to receiving the user selection. If the mobile application is installed on the mobile device, then mobile application content associated with the mobile application is caused to be displayed within the mobile application on the mobile device. If the mobile application is not installed on the mobile device, then mobile browser content associated with the mobile application is caused to be displayed within the mobile browser.

18 Claims, 8 Drawing Sheets

(56) References Cited

U.S. PATENT DOCUMENTS

| | | | | |
|---|---|---|---|---|
| 2010/0042911 A1* | 2/2010 | Wormald | ............... | G06F 3/147 715/205 |
| 2010/0269108 A1* | 10/2010 | Boudreau | .............. | G01C 21/20 717/178 |
| 2013/0086185 A1* | 4/2013 | Desmarais | ............. | H04L 51/10 709/206 |
| 2014/0223423 A1* | 8/2014 | Alsina | ....................... | G06F 8/65 717/173 |
| 2015/0154077 A1* | 6/2015 | Marra | ................... | G06F 11/143 714/15 |
| 2018/0343174 A1* | 11/2018 | Battre | .................... | H04L 41/50 |

* cited by examiner

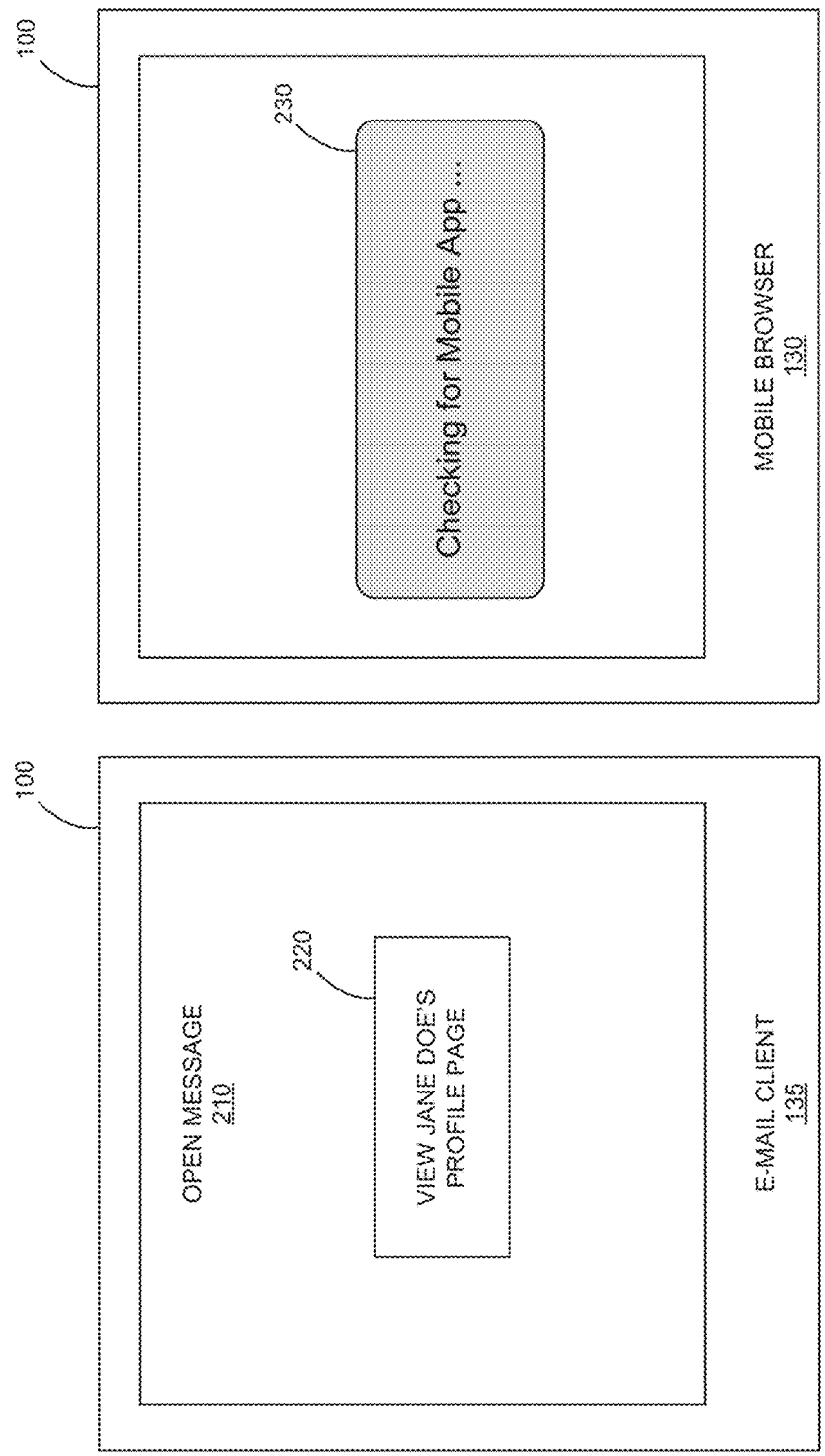

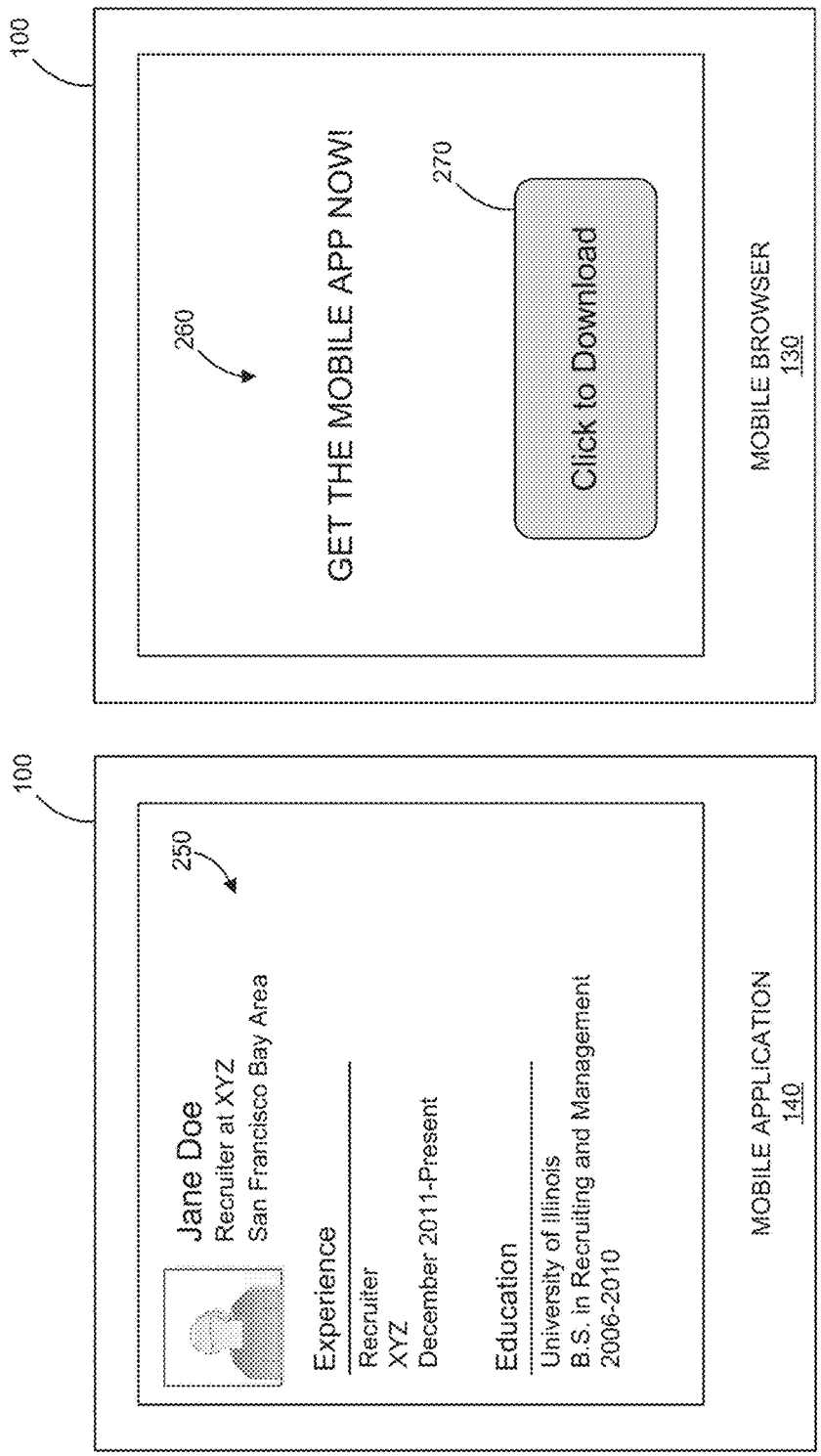

CONTROLLING THE ACTIONS OF A MOBILE BROWSER

CROSS-REFERENCE TO RELATED APPLICATIONS

This application claims priority to U.S. Provisional Application No. 61/863,165, filed on Aug. 7, 2013, and entitled, "CONTROLLING THE ACTIONS OF A MOBILE BROWSER," which is hereby incorporated by reference in its entirety as if set forth herein.

TECHNICAL FIELD

The present application relates generally to mobile devices. More specifically, the present disclosure relates to methods, systems and computer program products for controlling the actions of a mobile browser to accommodate situations where a mobile application corresponding to a selected link is installed on a mobile device, as well as situations where a mobile application corresponding to a selected link is not installed on a mobile device.

BACKGROUND

A mobile operating system (mobile OS) supports various types of computing resources, such as mobile applications (mobile "apps"), mobile clients, mobile browsers, and so on. At times, one resource may provide a better user experience than another resource. For example, the user experience provided by a mobile application associated with a social network service may be more rewarding and/or user-friendly than the user experience provided by accessing a web page of the social network service via a mobile browser, among other things. However, an appropriate mobile application for a particular situation is not always installed on a mobile device being used in that particular situation.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIGS. 2A-2E are display diagrams illustrating different stages and scenarios of controlling the actions of a mobile browser to accommodate situations where a mobile application corresponding to a selected link is installed, as well as situations where the mobile application is not installed, on a mobile device, in accordance with some embodiments;

DETAILED DESCRIPTION

Figure 1:
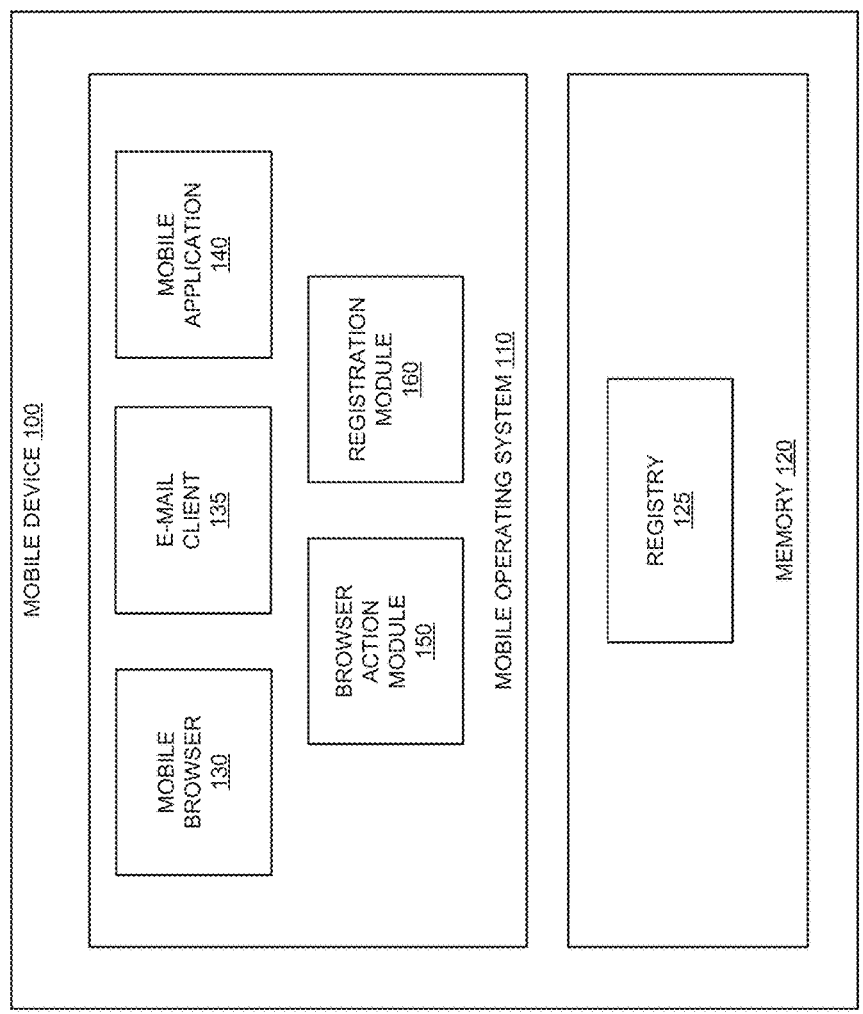
FIG. 1 is a block diagram illustrating various functional components of a mobile computing environment, in accordance with some embodiments.

Example methods and systems of controlling the actions of a mobile browser to accommodate situations where a mobile application corresponding to a selected link is installed, as well as situations where the mobile application is not installed, on a mobile device are described. In the following description, for purposes of explanation, numerous specific details are set forth in order to provide a thorough understanding of example embodiments. It will be evident, however, to one skilled in the art that the present embodiments may be practiced without these specific details.

In some embodiments, a method comprises causing a selectable link associated with a mobile application to be displayed within a mobile resource on a mobile device, receiving a user selection of the selectable link, and causing content associated with the selectable link to be displayed on the mobile device in response to receiving the user selection. The mobile resource may comprise an e-mail client or a mobile browser. Based on the mobile application being installed on the mobile device, mobile application content associated with the mobile application is caused to be displayed within the mobile application on the mobile device. Based on the mobile application not being installed on the mobile device, mobile browser content associated with the mobile application is caused to be displayed within the mobile browser on the mobile device.

In some embodiments, causing content associated with the selectable link to be displayed on the mobile device comprises attempting, at a first time, to redirect the mobile device to a first uniform resource identifier (URI) corresponding to the mobile application. In some embodiments, causing content associated with the selectable link to be displayed on the mobile device further comprises attempting, at a second time, to redirect the mobile device to the mobile browser content within the mobile browser, the second time being subsequent to the first time. In some embodiments, redirecting the mobile device to the mobile browser content comprises redirecting the mobile device to a second uniform resource identifier (URI) corresponding to the mobile browser content. In some embodiments, the second time is between 100 milliseconds and 500 milliseconds after the first time.

In some embodiments, the mobile browser content comprises an advertisement for downloading the mobile application. In some embodiments, the mobile browser content comprises a corresponding version of the mobile application content.

In some embodiments, the mobile application is a mobile application of a social network service. In some embodiments, the mobile application content comprises a profile page on the social network service.

In some embodiments, the mobile device comprises one of a smart phone, a tablet computer, and a wearable computing device.

Reference is made herein to "causing" links and other content to be displayed. Causing content to be displayed may comprise displaying the content. Causing content to be displayed may also comprise triggering the display of the content on another device, such as by sending instructions to, or otherwise directing, the other device to display the content.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

In the following description, for purposes of explanation, numerous specific details are set forth in order to provide a thorough understanding of the various aspects of different embodiments of the present disclosure. It will be evident, however, to one skilled in the art, that the subject matter of the present disclosure may be practiced without all of the specific details.

As described herein, a mobile operating system provided by a mobile device may provide various resources, such as mobile browsers, mobile applications, widgets and so on, and may navigate users between the resources, and otherwise within the mobile operating system, in a variety of ways. FIG. 1 is a block diagram illustrating various functional components of a mobile computing environment, consistent with some embodiments.

The mobile computing environment may be provided and/or supported by various hardware, such as a mobile device 100, that includes a processor configured to process and execute instructions presented by resources located within a mobile operating system 110 and/or instructions stored in memory 120 of the mobile device 100. Example mobile devices include tablet computers, mobile phones (e.g., smart phones), personal digital assistants, personal audio or video players, global positioning devices, laptop computers, digital cameras, mobile gaming devices, wearable computing devices, and/or other devices or machines capable of supporting a mobile operating system, including mobile applications and other resources, and executing instructions (sequential or otherwise) that specify actions to be taken by the devices.

As shown in FIG. 1, the mobile operating system 110 includes various computing resources, such as a mobile browser 130 and a mobile application 140. The mobile operating system 110 can facilitate the navigation between these resources by utilizing various configuration settings and options stored within a registry 125 of the memory 120, or other databases (not shown) within the memory 120, such as databases that store preferences or other configuration information. For example, the mobile operating system 110 may facilitate the launching of the mobile application 140 in response to a user selection of a link or other content presented by the mobile browser 130. The link or other content may be associated with the mobile application 140. However, there may be situations when the mobile application 140 is not installed on the mobile device 100. In these situations, the mobile operating system 110 may facilitate the presentation of an experience via the mobile browser 130 as an alternative to the experience via the mobile application 140 that is not available on the mobile device 100.

There may be situations where it is desirable to take one action on the mobile device 100 if the mobile application 140 is installed on the mobile device 100, and yet desirable to take another action on the mobile device 100 if the mobile application 140 is not installed on the mobile device 100. Accordingly, in some embodiments, the mobile operating system 110 comprises a browser action module 150 that is configured to control, direct, and/or cause the actions of the mobile browser 130 to accommodate situations where a mobile application (e.g., mobile application 140) corresponding to a selected link is installed on the mobile device 100, as well as situations where the mobile application corresponding to a selected link is not installed on the mobile device 100. For example, a selectable link associated with the mobile application 140 may be displayed within the mobile browser 130 on the mobile device 100. A user of the mobile device 100 may select the selectable link (e.g., by clicking or tapping on the selectable link). The browser action module 150 may then cause content associated with the selectable link to be displayed on the mobile device 100. If the mobile application 140 is installed on the mobile device 100, then mobile application content associated with the mobile application 140 is caused to be displayed within the mobile application 140 on the mobile device 100. However, if the mobile application 140 is not installed on the mobile device 100, then mobile browser content associated with the mobile application 140 is caused to be displayed within the mobile browser 130 on the mobile device 100.

In various embodiments, a technique may be employed to compensate for a mobile browser's lack of ability to determine whether a particular mobile application is installed on the mobile device. For example, in some embodiments, a URI registered with the mobile operating system 110 can be used to trigger the mobile application 140. When a user of the mobile device 100, which may or may not have the mobile application 140 installed on it, is presented with and selects a selectable link associated with the mobile application 140, JavaScript or HTML headers can be used to redirect the user back to the registered URI in order to launch the mobile application 140. Some period of time later (e.g., after a few hundred milliseconds), JavaScript or HTML headers can be used to redirect the user to an alternative experience in the mobile browser 130, such as an advertisement for the mobile application 140 or other mobile browser content associated with the mobile application 140 (e.g., a web sign-in form for a social network service associated with the mobile application 140). In some embodiments, this period of time is between 100 milliseconds and 500 milliseconds. However, other periods of time are also within the scope of the present disclosure. If the mobile application 140 is installed on the mobile device 100, then the first redirect may take the user to the mobile application 140 as expected, and the second redirect will not be run. Alternatively, if the mobile application 140 is not installed on the mobile device 100, then the first redirect may fail with an error. However, the error is then quickly overwritten by the alternative experience within the mobile browser 130. This alternative experience may comprise mobile browser content being displayed within the mobile browser 130. In some embodiments, the mobile browser content comprises an advertisement for downloading the mobile application. In some embodiments, the mobile browser content comprises a corresponding version of the content that would have been displayed in the mobile application 140 (mobile application content). Other types of mobile browser content are also within the scope of the present disclosure.

In some embodiments, the mobile operating system 110 also includes a registration module 160 configured to register an identifier for the mobile application 140 with the operating system 110. In some embodiments, the identifier is a URI. The registration module 160 can generate and/or assign a URI for the mobile application 140, and register the URI for the mobile application 140 within the registry 125 or within other similar mobile operating system databases.

For example, the registration module 160 may generate a URI having a scheme, such as: "socialnetwork:username" for social network mobile application, "socialnetwork: username#profile" for a certain page within the social network mobile application, and "map:location" for a mapping application. The registration module 160 can register the generated URI with the registry 125. The registration module 160 may generate the URI schemes and/or utilize predetermined URI schemes, such as the URI schemes found in the registry of URI schemes maintained by the Internet Assigned Numbers Authority (IANA). The URIs may comprise application uniform resource locators (URLs) and custom URLs. It is contemplated that other types of identifiers may be used and are within the scope of the present disclosure.

In some embodiments, the browser action module 150 is configured to control, direct, or otherwise modify a functionality of the mobile browser 130. For example, the browser action module 150 may modify a header element of the mobile browser 130 with instructions, such as instructions to launch the mobile application 140 in response to receiving a selection of a link to content presented by the mobile browser 130 and associated with the mobile application 140 by directing the mobile browser 130 to a URI associated with the mobile application 140 and registered with the mobile operating system 110 of the mobile device 100, and/or instructions to present content via a web page within the mobile browser 130 in response to receiving a selection of the link to content presented by the mobile browser 130 and associated with the mobile application 140 when the instructions to launch the mobile application 140 fail.

The browser action module 150 may be configured to modify different types of header elements, such as an HTML5 header element, a JavaScript header element, and/or other elements or code sections that provide introductory and/or navigational elements to the mobile browser 130 and/or sections of the mobile browser 130. Thus, the browser action module 150 may modify an HTML5 or JavaScript header element of the mobile browser 130 with instructions to launch the mobile application 140 in response to a selection of content displayed by the mobile browser 130 at a first time along with instructions to present content via a web page of the mobile browser 130 after the mobile application 140 is launched (or, fails to launch), such as at a second time later than the first time associated with launching of the mobile application 140.

The browser action module 150 and/or the registration module 160 may be implemented and/or provided as part of the mobile browser 130, as a plugin for the mobile browser 130, and in other ways. In some example embodiments, the mobile browser 130 and/or other resources within the mobile operating system 110 may provide the browser action module 150 and/or the registration module 160. It is contemplated that other configurations are also within the scope of the present disclosure.

FIGS. 2A-2E are display diagrams illustrating different stages and scenarios of controlling the actions of a mobile browser to accommodate situations where a mobile application corresponding to a selected link is installed, as well as situations where the mobile application is not installed, on a mobile device, in accordance with some embodiments.

In FIG. 2A, an open e-mail message 210 is displayed within the e-mail client 135 on the mobile device 100. The open e-mail message 210 includes a user-selectable element 220, such as a selectable link. The user-selectable element 220 can be associated with a mobile application, such as mobile application 140, as well as with specified content that is viewable within the mobile application. For example, the user-selectable element 220 can be associated with a social network mobile application (e.g., a LinkedIn® or Facebook® mobile application) and a social network profile page (e.g., a LinkedIn® or Facebook® profile page) of the sender of the open e-mail message 210. The social network profile page may be viewable within the social network mobile application. It is contemplated that other types of social network pages, as well as other types of content, are also within the scope of the present disclosure.

Upon selection of the user-selectable element 220, such as by a user of the e-mail client 135, the browser action engine 150 may perform one or more of the processes described herein in order to determine how to present the specified content (e.g., the sender's profile page) associated with the user-selectable element 220 to the user on the mobile device 100 in response to the selection.

As seen in FIG. 2B, in some embodiments, the browser action engine 150 may cause an intermediate message 230 to be displayed within the mobile browser 130 during the determination of whether the mobile application 140 associated with the user-selectable element 220 is installed on, or otherwise supported by, the mobile device 100. This intermediate message 230 may comprise information indicating to the user that the browser action module 150 is attempting to display the specified content associated with the user-selectable element 220 within the mobile application 140. In FIG. 2B, the intermediate message 230 reads, "Checking for Mobile App . . . ." Other types and configurations of intermediate messages 230 are also within the scope of the present disclosure.

If the mobile application 140 associated with the user-selectable element 220 is installed on the mobile device 100, then the specified content associated with the user-selectable element 220, and with the mobile application 140, is caused to be displayed within the mobile application 140 on the mobile device 100 in response to the selection of the user-selectable element 220. This specified content may also be referred to herein as mobile application content when displayed within the mobile application. As seen in FIG. 2C, the mobile operating system 110 may launch the mobile application 140 to display the specified content within the mobile application 140. For example, FIG. 2C depicts the mobile application 140 displaying the profile page 250 associated with the user-selectable element 220. Other types and configurations of content are also within the scope of the present disclosure.

If the mobile application 140 associated with the user-selectable element 220 is not installed on the mobile device 100, then mobile browser content associated with the mobile application 140 and/or with the user-selectable element 220 is caused to be displayed within the mobile browser 130 on the mobile device 100. As seen in FIG. 2D, the mobile browser 130 displays mobile browser content 260. In some embodiments, the mobile browser content 260 comprises an advertisement for downloading the mobile application 140. The advertisement may comprise text (e.g., "GET THE MOBILE APP NOW!") prompting the user to download the mobile application 140. The advertisement may also comprise a selectable element 270, such as a selectable link, that the user may click, tap, or otherwise select in order to download the mobile application 140 onto the mobile device 100 or to be taken to a page, via the web browser 130, where the user may initiate the downloading of the mobile application 140 onto the mobile device 100.

Figure 2E:
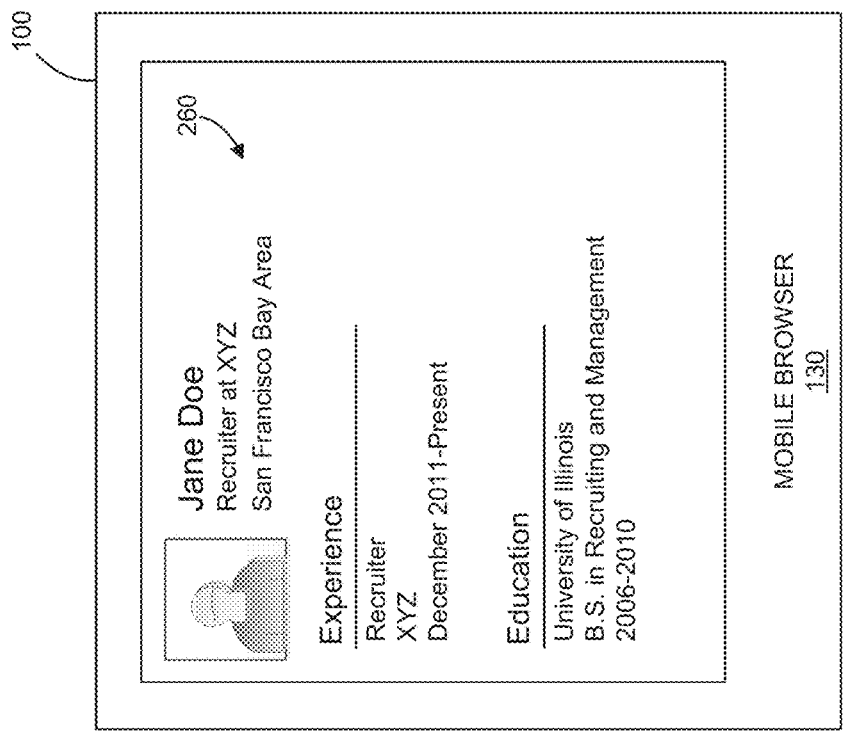

As seen in FIG. 2E, in some embodiments, the mobile browser content 260 comprises a corresponding version of the mobile application content (e.g., the profile page 250 in FIG. 2C) that would have been displayed within the mobile application 140 if the mobile application 140 was installed on the mobile device 100. This corresponding version may comprise the same, substantially the same, augmented, or otherwise overlapping content in relation to the mobile application content.

The browser action module 150 may facilitate other processes as well, in addition to the display of a profile page, such as OAuth processes for signing into websites and other online services. For example, suppose a user wishes to sign in to a website or other online service with her social network service (e.g., her LinkedIn® account), and navigates to the service via her mobile browser 130. In some embodiments, the browser action module 150 modifies a header element of the mobile browser 130, thereby causing the mobile browser 130 to redirect the user to the mobile application 140 for a one-click sign in when the mobile application 140 is installed on her mobile device 100. However, if the mobile application 140 is not installed on the mobile device 100, then the browser action module 150 may cause the display of a web page to receive her access credentials via the mobile browser 130. It is contemplated that other scenarios and configurations of implementing the features of the browser action module 150 are also within the scope of the present disclosure.

Figure 3:
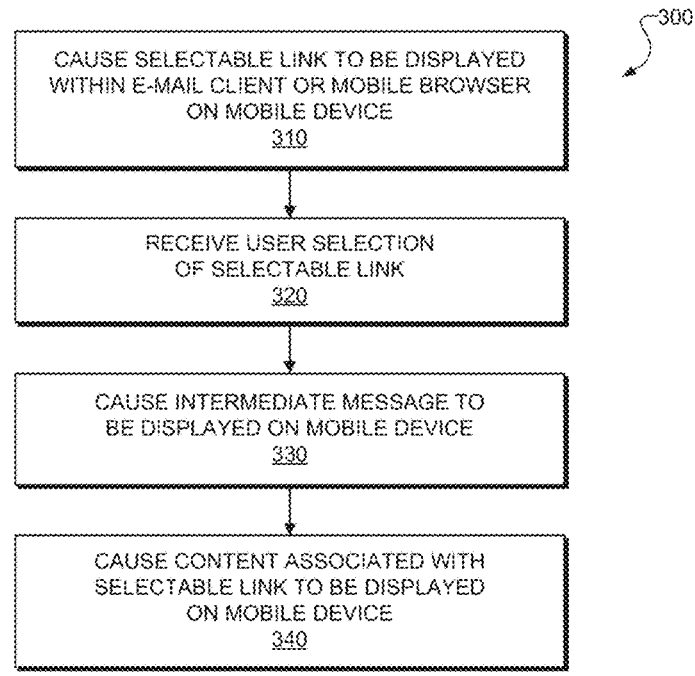
FIG. 3 is a flow diagram illustrating a method of controlling the actions of a mobile browser, in accordance with some embodiments.

FIG. 3 is a flow diagram illustrating a method 300 of controlling the actions of a mobile browser 130, in accordance with some embodiments. It is contemplated that the operations of method 300 may be performed by a system or modules of a system (e.g., browser action module 150 in FIG. 1). It will be appreciated that the method 300 may be performed on any suitable hardware. Although operations are described below as being performed by the browser action module 150, it is contemplated that other systems, engines, and/or modules may perform these operations as well. At operation 310, a selectable link 220 associated with a mobile application 140 is caused to be displayed within a mobile browser 130 on a mobile device 100. At operation 320, a user selection of the selectable link 200 is received. At operation 330, an intermediate message 230 is caused to be displayed on the mobile device 100. At operation 340, content associated with the selectable link 220 is caused to be displayed on the mobile device 100 in response to receiving the user selection. It is contemplated that the operations of method 300 may incorporate any of the other features disclosed herein.

Figure 4:
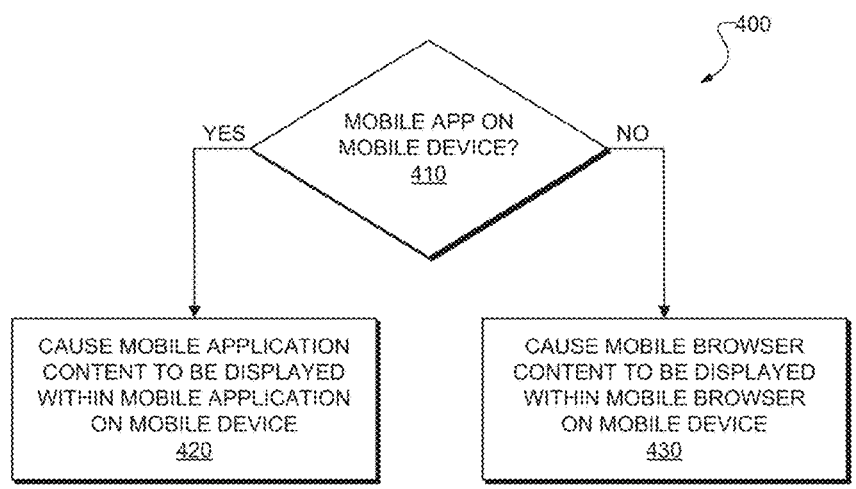
FIG. 4 is a flow diagram illustrating a method of causing content associated with a selectable link to be displayed on a mobile device, in accordance with some embodiments.

FIG. 4 is a flow diagram illustrating a method 400 of causing content associated with a selectable link 220 to be displayed on a mobile device 100, in accordance with some embodiments. It is contemplated that the operations of method 400 may be performed by a system or modules of a system (e.g., browser action module 150 in FIG. 1). It will be appreciated that the method 300 may be performed on any suitable hardware. Although operations are described below as being performed by the browser action module 150, it is contemplated that other systems, engines, and/or modules may perform these operations as well. At operation 410, it is determined whether or not a mobile application 140 is installed on the mobile device 100. If the mobile application 140 is installed on the mobile device 100, then, at operation 420, mobile application content associated with the mobile application 140 is caused to be displayed within the mobile application 140 on the mobile device 100. If the mobile application 140 is not installed on the mobile device 100, then, at operation 430, mobile browser content associated with the mobile application 140 is caused to be displayed within the mobile browser 130 on the mobile device 100. It is contemplated that the operations of method 400 may incorporate any of the other features disclosed herein.

Figure 5:
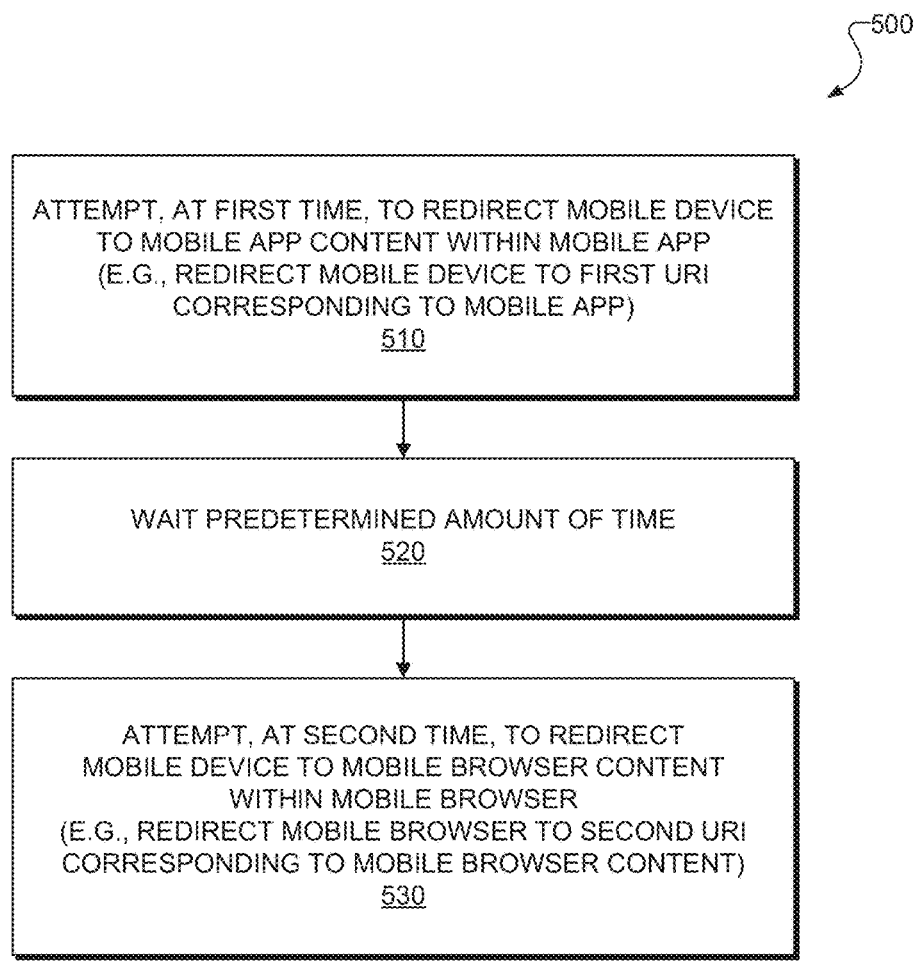
FIG. 5 is a flow diagram illustrating another method of causing content associated with a selectable link to be displayed on a mobile device, in accordance with some embodiments.

FIG. 5 is a flow diagram illustrating another method 500 of causing content associated with a selectable link to be displayed on a mobile device, in accordance with some embodiments. It is contemplated that the operations of method 500 may be performed by a system or modules of a system (e.g., browser action module 150 in FIG. 1). It will be appreciated that the method 500 may be performed on any suitable hardware. Although operations are described below as being performed by the browser action module 150, it is contemplated that other systems, engines, and/or modules may perform these operations as well. At operation 510, an attempt is made, at a first time, to redirect the mobile device 100 to mobile application content within the mobile application 140. For example, in some embodiments, an attempt is made to redirect the mobile device 100 to a first URI corresponding to the mobile application 140. At operation 520, a predetermined amount of time is waited. In some embodiments, the predetermined amount of time is between 100 milliseconds and 500 milliseconds. At operation 530, an attempt is made, at a second time after the predetermined amount of time has been waited, to redirect the mobile device 100 to mobile browser content 260 within the mobile browser 130. In some embodiments, redirecting the mobile device 100 to the mobile browser content 260 comprises redirecting the mobile device 100 to a second URI corresponding to the mobile browser content 260. It is contemplated that the operations of method 500 may incorporate any of the other features disclosed herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Example Mobile Device

Figure 6:
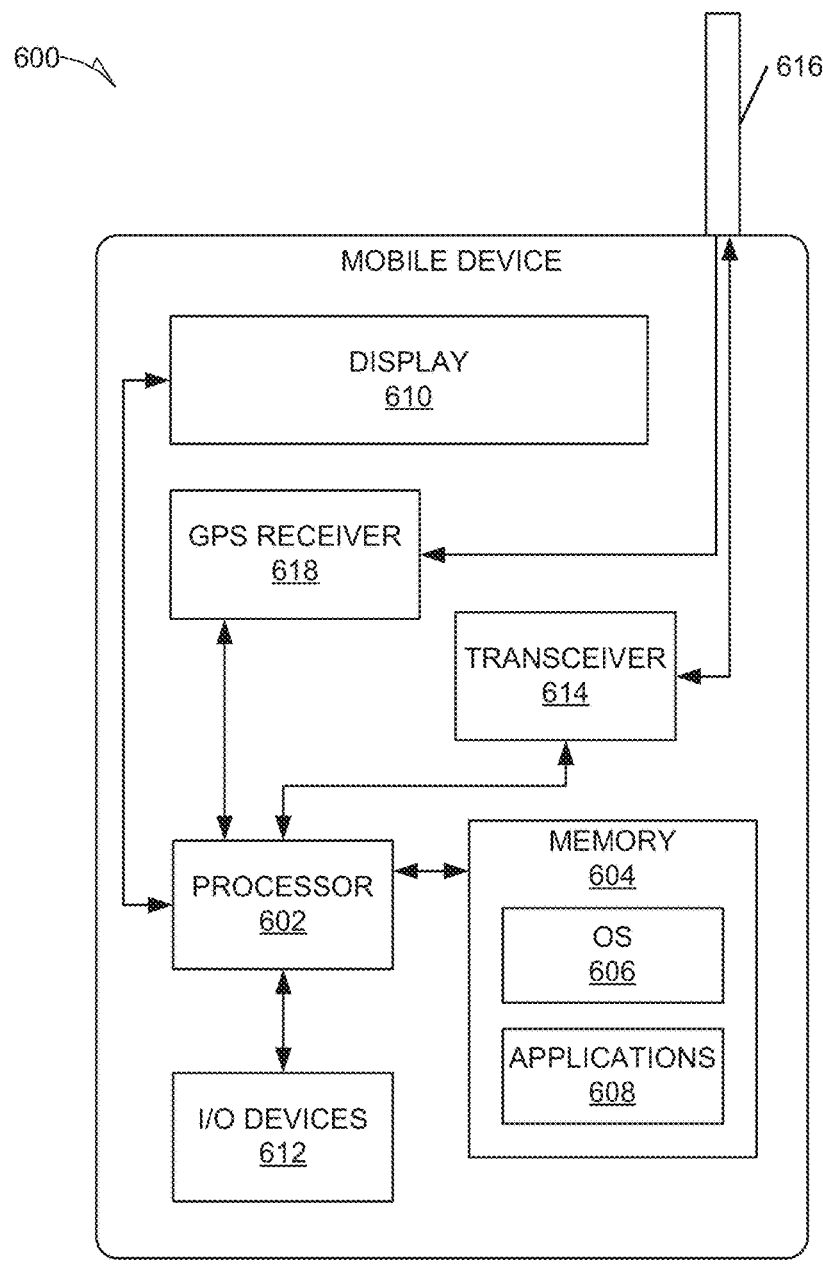
FIG. 6 is a block diagram illustrating a mobile device, in accordance with some embodiments.

FIG. 6 is a block diagram illustrating a mobile device 600, according to an example embodiment. The mobile device 600 may include a processor 602. The processor 602 may be any of a variety of different types of commercially available processors 602 suitable for mobile devices 600 (for example, an XScale architecture microprocessor, a microprocessor without interlocked pipeline stages (MIPS) architecture processor, or another type of processor 602). A memory 604, such as a random access memory (RAM), a flash memory, or other type of memory, is typically accessible to the processor 602. The memory 604 may be adapted to store an operating system (OS) 606, as well as application programs 608, such as a mobile location enabled application that may provide LBSs to a user. The processor 602 may be coupled, either directly or via appropriate intermediary hardware, to a display 610 and to one or more input/output (I/O) devices 612, such as a keypad, a touch panel sensor, a microphone, and the like. Similarly, in some embodiments, the processor 602 may be coupled to a transceiver 614 that interfaces with an antenna 616. The transceiver 614 may be configured to both transmit and receive cellular network signals, wireless data signals, or other types of signals via the antenna 616, depending on the nature of the mobile device 600. Further, in some configurations, a GPS receiver 618 may also make use of the antenna 616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
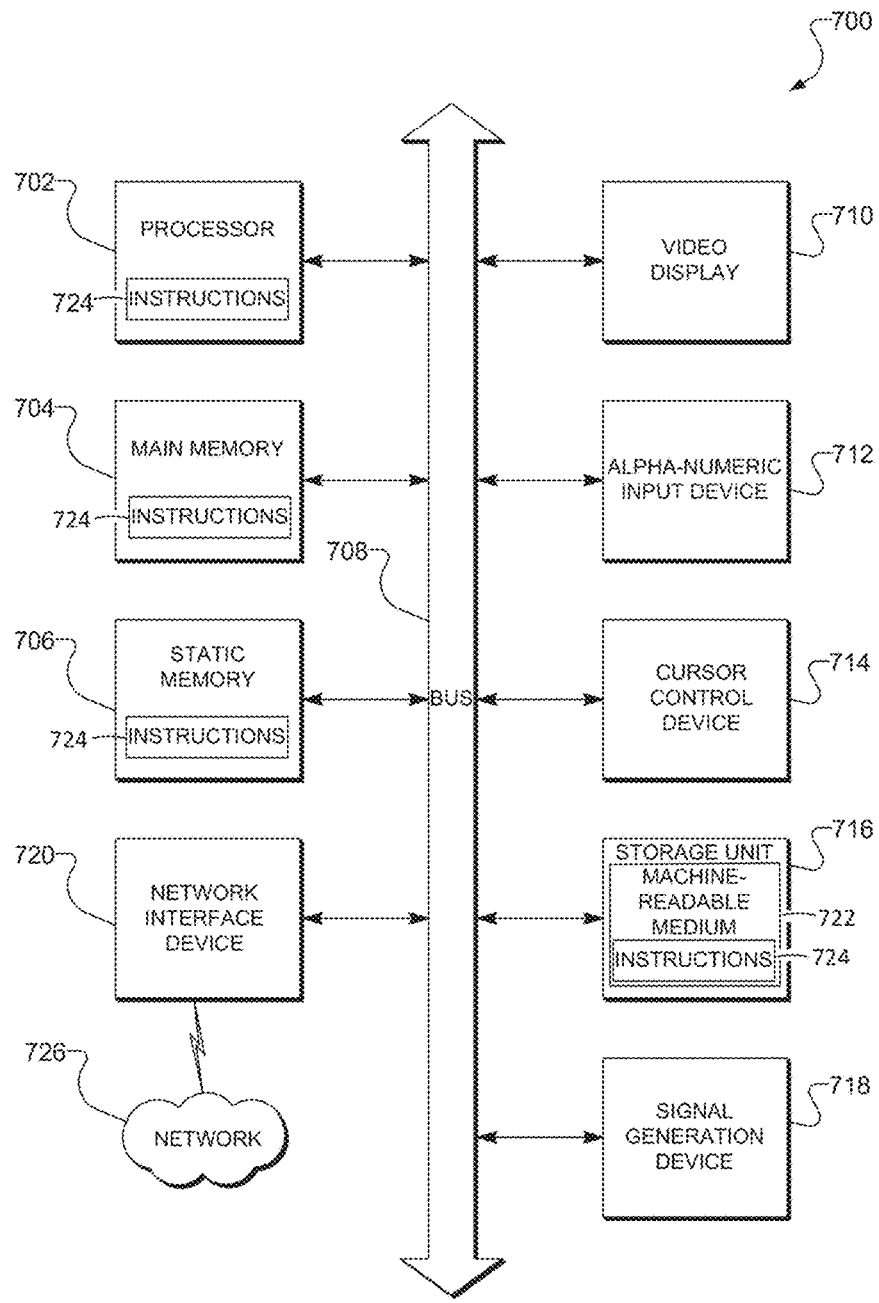
FIG. 7 is a block diagram of an example computer system on which methodologies described herein may be executed, in accordance with some embodiments.

FIG. 7 is a block diagram of an example computer system 700 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
modifying, by a module on a mobile device, a header element of a mobile browser on the mobile device with instructions;
causing a selectable link to be displayed within a mobile resource on the mobile device, the mobile resource comprising the mobile browser;
receiving a user selection of the selectable link; and
causing, by a machine having a memory and at least one processor, content associated with the selectable link to be displayed on the mobile device in response to receiving the user selection, the causing of the content associated with the selectable link to be displayed on the mobile device comprising:
attempting to cause mobile application content associated with a mobile application to be displayed within the mobile application on the mobile device by attempting, at a first time, to redirect the mobile device to a first uniform resource identifier corresponding to the mobile application; and
based on a predetermined amount of time after the first time passing without the mobile device being successfully redirected to the first uniform resource identifier, causing mobile browser content associated with the mobile application to be displayed within the mobile browser on the mobile device by redirecting the mobile device to a second uniform resource identifier corresponding to the mobile browser content within the mobile browser at a second time subsequent to the first time based on the modification of the header element of the mobile browser with the instructions, the mobile browser content comprising a selectable element to download the mobile application.

2. The method of claim 1, wherein the second time is between 100 milliseconds and 500 milliseconds after the first time.

3. The method of claim 1, wherein the mobile browser content comprises an advertisement for downloading the mobile application.

4. The method of claim 1, wherein the mobile browser content comprises a corresponding version of the mobile application content.

5. The method of claim 1, wherein the mobile application is a mobile application of a social network service.

6. The method of claim 5, wherein the mobile application content comprises a profile page on the social network service.

7. The method of claim 1, wherein the mobile device comprises one of a smart phone, a tablet computer, and a wearable computing device.

8. The method of claim 1, further comprising, in response to receiving the user selection of the selectable link, causing an intermediate message to be displayed on the mobile device, the intermediate message comprising information indicating that an attempt is being made to display the content associated with the selectable link within the mobile application on the mobile device.

9. The method of claim 1, wherein the attempting, at the first time, to redirect the mobile device to the first uniform resource identifier corresponding to the mobile application is performed based on the modification of the header element of the mobile browser with the instructions.

10. A system comprising:
a memory on a mobile device;
at least one processor, on the mobile device, coupled to the memory; and
a browser action module, on the mobile device and executable by the at least one processor, configured to:
modify a header element of a mobile browser on the mobile device with instructions;
cause a selectable link to be displayed within a mobile resource on the mobile device, the mobile resource comprising the mobile browser;
receive a user selection of the selectable link; and
cause content associated with the selectable link to be displayed on the mobile device in response to receiving the user selection, the causing of the content associated with the selectable link to be displayed on the mobile device comprising:
attempt to cause mobile application content associated with a mobile application to be displayed within the mobile application on the mobile device by attempting, at a first time, to redirect the mobile device to a first uniform resource identifier corresponding to the mobile application; and
based on a predetermined amount of time after the first time passing without the mobile device being successfully redirected to the first uniform resource identifier, cause mobile browser content associated with the mobile application to be displayed within the mobile browser on the mobile device by redirecting the mobile device to a second uniform resource identifier corresponding to the mobile browser content within the mobile browser at a second time subsequent to the first time based on the modification of the header element of the mobile browser with the instructions, the mobile browser content comprising a selectable element to download the mobile application.

11. The system of claim 10, wherein the mobile browser content comprises an advertisement for downloading the mobile application.

12. The system of claim 10, wherein the mobile browser content comprises a corresponding version of the mobile application content.

13. The system of claim 10, wherein the mobile application is a mobile application of a social network service.

14. The system of claim 13, wherein the mobile application content comprises a profile page on the social network service.

15. The system of claim 10, wherein the mobile device comprises one of a smart phone, a tablet computer, and a wearable computing device.

16. The system of claim 10, wherein the attempting, at the first time, to redirect the mobile device to the first uniform resource identifier corresponding to the mobile application is performed based on the modification of the header element of the mobile browser with the instructions.

17. A non-transitory machine-readable medium embodying a set of instructions that, when executed by a processor, cause the processor to perform operations, the operations comprising:
modifying, by a module on a mobile device, a header element of a mobile browser on the mobile device with instructions;

causing a selectable link to be displayed within a mobile resource on the mobile device, the mobile resource comprising the mobile browser;

receiving a user selection of the selectable link; and causing, by a machine having a memory and at least one processor, content associated with the selectable link to be displayed on the mobile device in response to receiving the user selection, the causing of the content associated with the selectable link to be displayed on the mobile device comprising:

attempting to cause mobile application content associated with a mobile application to be displayed within the mobile application on the mobile device by attempting, at a first time, to redirect the mobile device to a first uniform resource identifier corresponding to the mobile application; and based on a predetermined amount of time after the first time passing without the mobile device being successfully redirected to the first uniform resource identifier, causing mobile browser content associated with the mobile application to be displayed within the mobile browser on the mobile device by redirecting the mobile device to a second uniform resource identifier corresponding to the mobile browser content within the mobile browser at a second time subsequent to the first time based on the modification of the header element of the mobile browser with the instructions, the mobile browser content comprising a selectable element to download the mobile application.

18. The non-transitory machine-readable of claim 17, wherein the attempting, at the first time, to redirect the mobile device to the first uniform resource identifier corresponding to the mobile application is performed based on the modification of the header element of the mobile browser with the instructions.

\* \* \* \* \*

UNITED STATES PATENT AND TRADEMARK OFFICE
CERTIFICATE OF CORRECTION

Page 1 of 1

PATENT NO. : 10,306,050 B2
APPLICATION NO. : 14/194073
DATED : May 28, 2019
INVENTOR(S) : Vohra et al.

It is certified that error appears in the above-identified patent and that said Letters Patent is hereby corrected as shown below:

In the Claims

In Column 16, Line 12, in Claim 18, before "of", insert --medium--

Signed and Sealed this
Second Day of November, 2021

Drew Hirshfeld
*Performing the Functions and Duties of the
Under Secretary of Commerce for Intellectual Property and
Director of the United States Patent and Trademark Office*